United States Patent [19]

Takahashi et al.

[11] 4,270,723
[45] Jun. 2, 1981

[54] PANTOGRAPH MECHANISM

[75] Inventors: Naoyuki Takahashi, Hino; Toshihiko Kadota, Hachioji, both of Japan

[73] Assignee: Olympus Optical Co., Ltd., Tokyo, Japan

[21] Appl. No.: 2,247

[22] Filed: Jan. 10, 1979

[30] Foreign Application Priority Data

Feb. 18, 1978 [JP] Japan .................................. 53/17132

[51] Int. Cl.³ ............................................ F16M 13/00
[52] U.S. Cl. ............................... 248/421; 248/281.1; 248/284; 248/585
[58] Field of Search .................. 248/281.1, 284, 585, 248/421; 108/4; 33/25 R, 25 E, 25 B, 23 R

[56] References Cited

U.S. PATENT DOCUMENTS

| 586,415 | 7/1897 | Biddle | 248/281.1 |
| 1,174,881 | 3/1916 | Ludlum | 248/585 |
| 1,711,768 | 5/1929 | Bausch et al. | 248/585 |
| 2,036,097 | 3/1936 | Pieper | 248/284 |
| 2,531,572 | 11/1950 | Knoedler | 248/585 X |
| 2,557,608 | 6/1951 | Mast et al. | 248/585 |
| 3,070,340 | 12/1962 | Cohn | 248/284 |
| 3,211,314 | 10/1965 | Ulinski | 248/284 X |

FOREIGN PATENT DOCUMENTS 841588 3/1939 France ........................................ 108/4

Primary Examiner—Francis K. Zugel
Attorney, Agent, or Firm—Ostrolenk, Faber, Gerb & Soffen

[57] ABSTRACT

A pantograph mechanism comprises a support member adapted for mounting on a stationary support, a holding member disposed in parallel relationship with the support member and adapted for mounting on it a member to be moved, and a pair of links which connect the holding and the support members. The area occupied by the pantograph mechanism is minimized by means of a judicious choice of shape for the links, while permitting a translational movement of the holding member relative to the support member.

4 Claims, 8 Drawing Figures

PANTOGRAPH MECHANISM

BACKGROUND OF THE INVENTION

The invention relates to a pantograph mechanism, and more particularly, to a pantograph mechanism which may be used to move a member principally in the vertical direction by means of a linkage.

A pantograph mechanism which is used to support a member such as a microscope on a mount in a manner to be movable vertically usually comprises a linkage as shown in FIG. 1. Specifically, the linkage shown comprises a support member 1 which has its base end 1a mounted on a horizontal portion of a mount and which extends vertically, a holding member 2 disposed in parallel relationship with the support member 1 and adapted to carry a member to be moved on one end 2a; a link 3 which has one end pivotally connected with end of the holding member 2 and the other pivotally connected to end 1b of the support member 1 by means of pivots 5, 6; and another link 4 which has its ends pivotally connected respectively with a portion of the support member 1 adjacent to the end 1a and with a portion of the holding member 2 adjacent to base end 2b by means of pivots 7, 8. Both support member 1 and holding member 2 comprise arm members. The center axes of the pivots 5, 7 define immovable points O, O' during an angular movement of the links 3, 4 while the center axis of the pivot 6 defines a displaceable point P.

Because the described pantograph mechanism comprises four members, namely, support member 1, holding member 2 and links 3, 4 assembled together to form a parallellogram, it occupies an area S as shown in FIG. 2, and also requires a large area for its operation, presenting difficulties in that its operation may interfere with other parts. When the displaceable point P is to be moved vertically, there results a certain unavoidable degree of lateral or horizontal displacement. To minimize the horizontal displacement and achieve good accuracy in the intended vertical movement, the increased overall size of the mechanism must be increased, thus requiring an even greater occupied area S.

SUMMARY OF THE INVENTION

It is an object of the invention to provide a pantograph mechanism which eliminates the above disadvantages of the prior art by the use of modified links to connect the holding member and the support member.

In accordance with the invention, a pair of modified links are used to connect a support member and a holding member. The links have vertical portions which are disposed opposite to the support member and the holding member, respectively, and also include horizontal portions which are disposed opposite to each other, thus minimizing the occupied area of the mechanism. The area which is necessary for its operation is also minimized, affording a great convenience in the disposition and handling of the mechanism. Since the occupied area of the mechanism is reduced, the overall mechanism may be magnified to improve the accuracy with which a vertical movement is achieved. It is to be noted that no more parts are required than for the prior art, avoiding an increase in the manufacturing cost.

DESCRIPTION OF PREFERRED EMBODIMENTS

Figure 1:
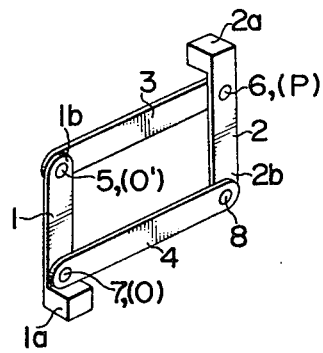
FIG. 1 is a perspective view showing one example of a conventional pantograph mechanism.
Figure 2:
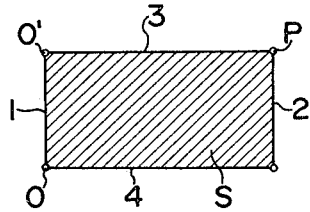
FIG. 2 is a diagram illustrating the occupied area of the pantograph mechanism shown in FIG. 1.
Figure 3:
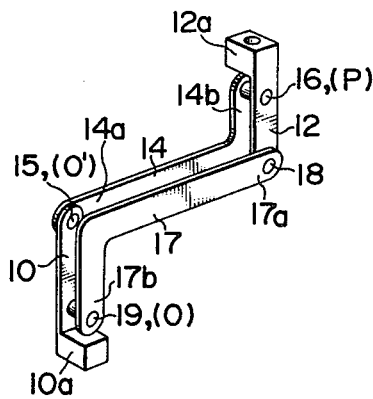
FIG. 3 is a perspective view of a pantograph mechanism according to one embodiment of the invention.

Referring to FIG. 3, there is shown a pantograph mechanism according to the invention. It includes a support member 10 formed by an arm member having its lower end or base end 10a rotatably mounted on a stationary support 11 (see FIG. 6) and extending vertically upward. The pantograph mechanism also includes a holding member 12 which is disposed in parallel relationship with the support member 10 and formed similarly by an arm member. It includes a base on its upper end 12a on which a member 13 such as a microscope (see FIG. 6) can be rotatably mounted. The holding member 12 vertically extends downward in parallel relationship with the support member 10.

Two L-shaped links 14, 17 are interposed between the support and holding members 10, 12 to connect them together. Both links include horizontal portions 14a, 17a which are disposed opposite each other. The links are reversed in that a vertical portion 17b of link 17 is normally disposed opposite support member 10 while a vertical portion 14b of the other link 14 is normally disposed opposite the holding member 12. The opposite ends of respective links 14, 17 are pivotally connected with the support member 10 and the holding member 12. Specifically, the end of horizontal portion of link 14 is disposed in alignment with the upper end of the support member 10 and is pivotally connected therewith by means of pivot 15 while the end of the vertical portion of link 17 is disposed in alignment with a portion of the support member 10 close to the base 10a, and is pivotally connected therewith by means of pivot 19. The end of the horizontal portion of link 17 is disposed in alignment with the lower end of the holding member 12 and is pivotally connected therewith by means of pivot 18 while the end of the vertical portion of link 14 is pivotally connected with the holding member 12 at a point adjacent to the base 12a.

A frictional coupling is provided by pivots 15, 18 between the support member 10 and link 14 and between holding member 12 and link 17 in order to present a frictional resistance to a free rotation of links 14, 17. Specifically, referring to FIG. 4, pivot 15 has a head 15b and is rotatably passed through aligned openings in the corresponding ends of the holding member 10 and link 14. The free end of the pivot 15 is formed with a threaded opening in which a headed set screw 15a is engaged. A plain washer 20 is interposed between the head 15b and the support member 10 and another washer 21 is placed between the support member 10 and the horizontal portion 14a of the link 14. In addition, a resilient wave washer 22 is disposed between the horizontal portion 14a of link 14 and the head 15c of set screw 15a. The resilience of the wave washer 22 provides a frictional coupling between the support member 10 and link 14 when plain washer 21 is interposed therebetween. Similarly, a frictional coupling is provided between the holding member 12 and the end of horizontal portion 17a of link 17. The frictional coupling prevents an unintended rotation of links 14, 17 due to their own weight while permitting their rotation when they are externally driven.

Figure 5A:
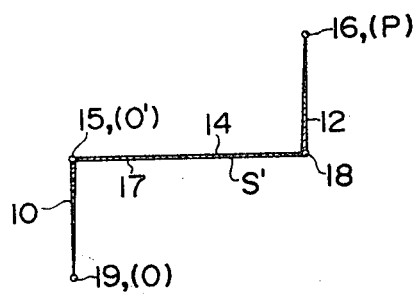
FIGS. 5(A) and (B) are diagrams illustrating the occupied area of the pantograph mechanism of FIG. 3 in different operative positions.
Figure 5B:
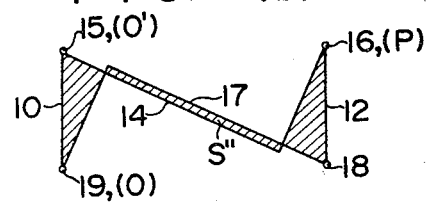

In the pantograph mechanism thus constructed, the center axes of pivots 15, 19 define immovable or fixed points O', O during an angular movement of the links 14, 17 while the center axis of pivot 16 defines a displaceable point P, as in the conventional arrangement. In the normal position of the mechanism illustrated in FIG. 5(A) when the links 14, 17 are in complete alignment with both members 10, 12, the occupied area S' of the mechanism, which is shown hatched, is minimized. In a displaced position of the mechanism, illustrated in FIG. 5(B), where the point P has been vertically displaced through a stroke substantially equal to the length of the holding member 12, the occupied area S" does not increase substantially value. Thus it is seen that the pantograph mechanism of the invention exhibits a greatly reduced occupied area as compared with a conventional arrangement.

Figure 6:
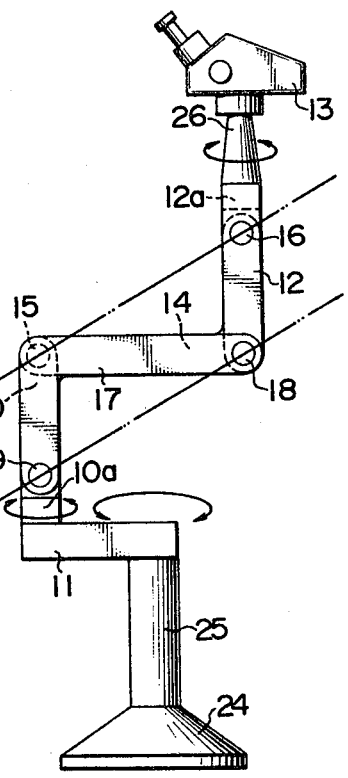
FIG. 6 is a side elevation of apparatus for moving a microscope to which the pantograph mechanism of the invention is applied.

FIG. 6 illustrates one application of the pantograph mechanism to an apparatus used to move a microscope. In this instance, there is provided a mount 24 which carries a support shaft 25 on which a horizontal support 11 is rotatably mounted. The base 10a of the support member 10 is rotatably mounted on the support 11 and extends vertically upward. A microscope 13, which could be replaced by any other object to be moved, is rotatably mounted on the base 12a of the holding member 12 by means of a tapered shaft 26. In order to securely maintain the microscope in a desired position, a counterweight G which is equal to weight to the microscope is disposed on an extension of either link 14 or link 17. When the counterweight is located on an extension of link 14 as shown in FIG. 6, it is preferably positioned on an extension 1 which joins the pivots 16 and 15. When the counterweight G' is located on an extension of link 17, it is preferably positioned on an extension 1' which joins pivots 18 and 19. In this manner, the microscope can be smoothly moved to any desired position and securely maintained at such position.

Figure 4:
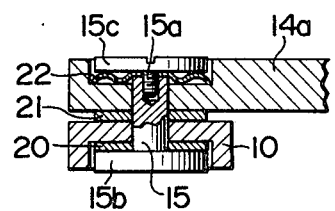
FIG. 4 is a fragmentary cross section illustrating the construction of the connection between the support member and the link shown in FIG. 3.
Figure 7:
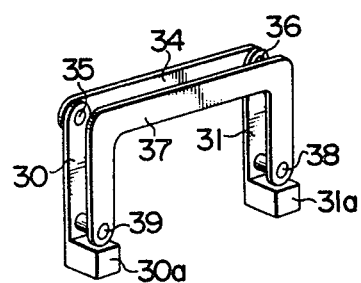
FIG. 7 is a perspective view of a pantograph mechanism according to another embodiment of the invention.

In the embodiment shown in FIGS. 3 to 5, the free end of members 10, 12 extend in opposite directions from their respective bases 10a, 12a, and these members are used in combination with the pair of L-shaped links 14, 17 in order to hold the member 13 at a raised position. However, when the member 13 is to be supported at a lowered position, an arrangement as shown in FIG. 7 may be used. In this instance, support member 30 and holding member 31 have their bases 30a, 31a at their respective lower ends and are disposed vertically in parallel relationship with each other. Their free ends are pivotally connected with the ends of a link 34 by means of pivots 35, 36. A U-shaped link 37 is disposed in opposing relationship with both members 30, 31 and link 34, and has its ends pivotally connected with the members 30, 31 adjacent to their respective base ends 30a, 31a by means of pivots 38, 39, respectively. A member to be moved can be attached to the base 31a. This arrangement achieves the same effect as described in connection with the preceding embodiment.

What is claimed is:

1. A pantograph mechanism, comprising:
    a first generally planar leg member comprising a first L-shaped link, a holding member and a first pivot joint, said first pivot joint connecting one end of said first L-shaped link and one end of said holding member so they are rotatable with respect to each other about said pivot joint in a generally coplanar manner; said first member having another end adapted to hold an object mounted thereon;
    a second generally planar leg member comprising a second L-shaped link identical in size and shape to said first L-shaped link, a support member and a second pivot joint, said second pivot joint joining one end of said support member and one end of said second L-shaped link so that said second L-shaped link and said support member are rotatable with respect to each other about said second pivot joint in a generally coplanar manner; said support member having another end adopted to be mounted on a stationary support;
    a third pivot joint connecting the other end of said first L-shaped link with a portion of said support member near said other end of said support member; a fourth pivot joint connecting the other end of said second L-shaped link to said holding member near said other end of said holding member; and
    said pantograph mechanism being moveable into a position in which said first and second leg members oppose each other face-to-face along substantially the entire length of each.

2. The device of claim 1, wherein said support member is longer in the direction of extension between said one end of said support member and said second pivot joint than in its other dimensions; and wherein said holding member is longer in the direction of extension between said one end of said holding member and said fourth pivot joint than in its other dimensions.

3. The device of claim 1, wherein said pivot joints are the source of sufficient friction to ensure that said holding member, having been positioned with respect to said support member, will not move under the influence of gravity on said holding member and on an object mounted thereon.

4. The device of claim 3 wherein said pivot joints each comprise a rivet means and at least one corrugated washer in contact with and on which pressure is exerted by both said rivet means and one of the two pieces connected by the pivot connection in question.

* * * * *